United States Patent
Sahin (10) Patent No.: US 12,296,979 B2
(45) Date of Patent: May 13, 2025

(54) ATTACK HELICOPTER

(71) Applicant: TUSAS- TURK HAVACILIK VE UZAY SANAYII ANONIM SIRKETI, Ankara (TR)

(72) Inventor: Burhan Sahin, Ankara (TR)

(73) Assignee: TUSAS- TURK HAVACILIK VE UZAY SANAYII ANONIM SIRKETI, Ankara (TR)

( * ) Notice: Subject to any disclaimer, the term of this patent is extended or adjusted under 35 U.S.C. 154(b) by 0 days.

(21) Appl. No.: 18/268,418

(22) PCT Filed: May 26, 2021

(86) PCT No.: PCT/TR2021/050489
§ 371 (c)(1),
(2) Date: Jun. 20, 2023

(87) PCT Pub. No.: WO2022/146287
PCT Pub. Date: Jul. 7, 2022

(65) Prior Publication Data
US 2024/0034469 A1 Feb. 1, 2024

(30) Foreign Application Priority Data
Dec. 30, 2020 (TR) ................. 2020/22425

(51) Int. Cl.
*B64D 7/02* (2006.01)
*B64C 27/04* (2006.01)
(52) U.S. Cl.
CPC ............. *B64D 7/02* (2013.01); *B64C 27/04* (2013.01)

(58) Field of Classification Search
CPC .. F41A 9/34; B64C 27/04; B64D 7/02; B64D 7/00; B64D 7/04; B64D 7/06
See application file for complete search history.

(56) References Cited

U.S. PATENT DOCUMENTS

| | | | | |
|---|---|---|---|---|
| 2,386,894 A | * | 10/1945 | Groydon | F41A 9/86 89/33.16 |
| 2,398,263 A | * | 4/1946 | Trimbach | F41A 9/79 89/34 |
| 2,550,837 A | * | 5/1951 | Mackenzie | F41A 9/54 89/33.14 |

(Continued)

FOREIGN PATENT DOCUMENTS

EP 2133266 A2 12/2009

OTHER PUBLICATIONS

International Search Report and Written Opinion for PCT application No. PCT/TR2021/050489, mailed Jul. 19, 2021.

(Continued)

Primary Examiner — Joshua E Freeman
(74) Attorney, Agent, or Firm — Notaro, Michalos & Zaccaria P.C.

(57) ABSTRACT

An attack helicopter has a body exposed to air flow during the flight of the respective air vehicle, at least one ammunition fired to attack a target, at least one machine cannon enabling the ammunition to be fired, at least one ammunition duct on the body, enabling the ammunition to be placed therein and the ammunition to be transferred to the machine cannon, and a butt line arranged so as to extend lengthwise on the air vehicle and symmetrically divide the air vehicle in two.

13 Claims, 6 Drawing Sheets

(56) References Cited

U.S. PATENT DOCUMENTS

| | | | | | |
|---|---|---|---|---|---|
| 3,911,787 | A | * | 10/1975 | Seibel | F42B 39/20 89/34 |
| 4,424,735 | A | * | 1/1984 | Bacon | B65G 1/133 89/34 |
| 4,762,049 | A | * | 8/1988 | Hughes | F41A 9/54 89/33.14 |
| 4,785,710 | A | * | 11/1988 | Schofield | F41A 9/04 89/1.804 |
| 4,951,548 | A | * | 8/1990 | Wixon | F41A 9/34 89/33.14 |
| 4,955,280 | A | * | 9/1990 | Baldwin | F41A 9/37 89/36.13 |
| 4,982,650 | A | * | 1/1991 | Bender-Zanoni | F41A 9/76 89/34 |
| 5,111,729 | A | * | 5/1992 | Tassie | F41A 9/74 89/33.02 |
| 5,419,234 | A | * | 5/1995 | Sanderson | B64D 7/00 89/33.16 |
| 5,458,045 | A | * | 10/1995 | Sanderson | F41A 23/02 89/33.16 |
| 5,932,831 | A | * | 8/1999 | Bandera | B64D 7/00 89/33.14 |
| 7,765,912 | B1 | * | 8/2010 | Serkland | F41A 23/00 89/37.16 |
| 8,381,630 | B2 | * | 2/2013 | Pancotti | B64D 7/04 89/33.14 |
| 2010/0044508 | A1 | * | 2/2010 | Pancotti | F41A 9/79 244/118.1 |
| 2010/0294120 | A1 | * | 11/2010 | Deckard | F41A 9/34 89/33.4 |
| 2012/0137863 | A1 | | 6/2012 | Buechler et al. | |
| 2014/0230641 | A1 | * | 8/2014 | Isola | F41A 23/24 89/37.17 |

OTHER PUBLICATIONS

International Preliminary Report on Patentability, completed Feb. 3, 2023.
Demand/Request for Preliminary Examination dated Oct. 31, 2022.
Written Opinion of the International Preliminary Examining Authority dated Nov. 16, 2022.
Response to Office Action dated Jan. 16, 2023.
International Application Status Report generated May 22, 2023.

* cited by examiner

ATTACK HELICOPTER

FIELD

This invention relates to an attack helicopter with a machine cannon to fire ammunition.

BACKGROUND

Attack helicopters use external loads such as rockets or machine cannons using bullets to attack a target. Especially for land forces demanding air support, machine cannons deployed in attack helicopters are critical with the close air support they provide. Ammunition fired from machine cannons is stored in structures called the ammunition box (ammobox) in attack helicopters and transmitted from the ammunition box to the machine cannon through ducted structures called the ammunition duct (ammoduct). Machine cannons provide an effective performance on the battlefield, especially in close combats, by allowing high numbers of ammunition to be fired on the target in a very short time in close air support. Albeit the fact that the ammunition box and the ammunition duct can be disposed inside the body of attack helicopters, there are also attack helicopters where the ammunition box is not provided and only the ammunition duct is positioned on the side out of the body.

The United States patent application document U.S. Pat. No. 3,911,787, which is included in the known state of the art, describes a system for removing the ammunition box from the attack helicopter when the explosion risk of bullets is to occur. In that system, explosion covers are placed at the lower part of the ammunition box placed in the lower part in the body and, in case of a potential explosion of the ammunition, the ammunition box is enabled to be ejected from the attack helicopter. It is further enabled to place the ammunition in the ammunition box and ammunition duct in a downward-facing manner, which contributes to the ejection of ammunition from the air vehicle when the risk of explosion is to occur. Two ammunition ducts are provided inside the body of the attack helicopter, between the ammunition box and the machine cannon.

The United States patent application document U.S. Pat. No. 5,932,831, which is included in the known state of the art, describes that ammunitions provided in connection to each other are contained in an ammunition duct in double rows. It is described that the ammunition duct narrows such that the ammunition present in the ammunition duct in two rows, as from the exit of the ammunition box, reduces to a single row in the part approaching the machine cannon and that the ammunition duct enables the ammunition to be delivered to the machine cannon in a single row.

The United States patent application document US20120137863, which is included in the known state of the art, describes the back feeding of empty ammunition casings and ammunition interlinks to the ammunition duct. Thus, the risk is reduced that empty casings and ammunition interlinks hit the external loads such as rockets or the pilot compartment in attack helicopters.

Another patent document is EP2133266A2 which forms part of the state of the art. EP2133266A2 is describing an aircraft wing for a helicopter. The aircraft wing has at least one weapon (8), and a feed duct (13) for feeding the weapon (8) with ammunition (9) supplied in the form of a belt (10); the wing (4) has a compartment (20) for housing a portion (54) of the belt (10) and connectable to a loading opening (14) of the feed duct (13). It is an object of the present invention to provide for feed to the turret without impairing the aerodynamic characteristics of the helicopter cheaply and easily.

In the currently-used attack helicopters in the known state of the art, the ammunition box is placed on the body, in the form of a box almost at the level of the compartment where the pilot is present, and the ammunition duct is placed on the body between the machine cannon and the ammunition box, facing inside the body. In attack helicopters having only ammunition ducts, in turn, the ammunition duct is located on the attack helicopter's body, lateral to the body.

SUMMARY

With an attack helicopter developed by this invention, it is enabled to reduce the positional shift of the center of gravity of the attack helicopter during the firing of ammunition.

Another object of this invention is to reduce the stability and vibration problems occurring during the firing of ammunition by the machine cannon and to decrease the likelihood that the machine cannon misses its target.

A further object of this invention is to provide an improvement in the capacity and distribution of payload of the air vehicle by efficiently positioning the ammunition in the attack helicopter.

Yet a further object of this invention is to facilitate for the technicians to access the ammunition during maintenance or repair of attack helicopters.

The attack helicopter developed to achieve the object of the invention, as defined in the first claim and in the claims dependent thereon, comprises a body exposed to air flow during the flight of the air vehicle, at least one ammunition fired to attack a target, at least one machine cannon enabling the ammunition to be fired, at least one ammunition duct on the body, enabling the ammunition to be placed therein and the ammunition to be transmitted to the machine cannon, and a butt line being disposed so as to extend along the direction in which the air vehicle extends and dividing the air vehicle symmetrically in two.

The attack helicopter of the invention includes an ammunition duct that enables almost all of the ammunition to be located on the body to extend along the direction of the butt line, thus allowing almost each of the ammunition to be transmitted in almost the same direction one after another and enabling the ammunition to be efficiently placed on the body. Here, the inclusion of the ammunition in the ammunition box, which constitutes a high mass for the attack helicopter, has thus been eliminated and almost all ammunition is contained in the ammunition duct.

In an embodiment of the invention, the attack helicopter comprises an ammunition duct located on the body and on the sides of the body, extending to be almost mirror symmetrical with respect to the butt line, thereby allowing an effective placement of the ammunition on the body.

In an embodiment of the invention, the attack helicopter comprises an ammunition duct located on the body, so as to be underneath the body, from the body towards the exterior of the air vehicle, and extending almost exactly along the direction in which the butt line extends, thereby allowing an effective placement of the ammunition in the body.

In an embodiment of the invention, the attack helicopter comprises an ammunition duct which, based on a plane of symmetry that symmetrically divides the attack helicopter along the butt line in two and based on an inclination angle that the ammunition forms with the plane of symmetry, as is predetermined by the manufacturer, enables the blockage risk of ammunition to be reduced while the air vehicle is firing as a result of enabling the ammunition to be disposed so as to make an inclination angle with the plane of symmetry. The ammunition has an inclined form relative to the body and is contained in the ammunition duct in an inclined manner with respect to the body.

In an embodiment of the invention, the attack helicopter comprises an ammunition duct that contacts the surfaces in such a way that there is almost no gap left between it and the machine cannon, is one-piece with the body in such a way as to be form compatible therewith in terms of aerodynamics, and extends almost exactly along the direction in which the butt line extends, thereby aerodynamically improving the air flow taking place over it.

In an embodiment of the invention, the attack helicopter comprises more than one rotary actuator located on the body so as to be spaced apart from each other and enabling the ammunition to be transmitted uninterruptedly and continuously along the ammunition duct, more than one gear enabling the drive received from the rotary actuator to be transmitted, and more than one rotary retainer located on the body so as to be spaced apart from each other and to be able to rotate about its own axis and enabling the ammunition to be transmitted by pushing them towards the machine cannon by means of the drive transmitted from the gear.

In an embodiment of the invention, the attack helicopter comprises ammunition in at least two rows and at least one separator wall positioned between each row, thereby preventing the ammunition in different rows from contacting each other and reducing the risk of ammunition blockage during firing.

In an embodiment of the invention, the attack helicopter comprises a separator wall that reduces the blockage risk of ammunition based on its beveled, radiused and/or notched form.

In an embodiment of the invention, the attack helicopter comprises at least two ammunition ducts located on the sides of the body; and at least one passage section located between the at least two ammunition ducts, enabling the ammunition ducts to have an integrated form, thereby allowing the ammunition to be passed through the ammunition ducts located on the sides and to be delivered uninterruptedly and continuously to the machine cannon.

In an embodiment of the invention, the attack helicopter comprises at least one feeding inlet located on the ammunition duct and enabling the ammunition to be placed in the ammunition duct by a technician, at least one empty casing, which is the remaining part when ammunition transmitted from the ammunition duct is fired, and a machine cannon, transmitting the empty casings towards the feeding inlet to be directed back to the ammunition duct, thereby reducing the air vehicle's positional shift of the center of gravity during firing.

In an embodiment of the invention, the attack helicopter comprises an ammunition duct having an almost entirely rectangular cross-sectional form.

In an embodiment of the invention, the attack helicopter comprises an ammunition duct that extends almost exactly along the direction in which the butt line extends and reduces the blockage risk of ammunition during firing due to its radiused cross-sectional transitions.

In an embodiment of the invention, the attack helicopter comprises a machine cannon having a single feeding or double feeding system configuration. The technician carries out the placement of ammunition into the ammunition duct from one side of the air vehicle in a single feeding configuration, and from both sides of the air vehicle in a double feeding configuration.

In an embodiment of the invention, the attack helicopter comprises a tail, as a control surface, in the rear side of the air vehicle, and an ammunition duct protruding towards the butt line almost in the tail region of the air vehicle and allowing the ammunition to be placed almost exactly in same directions as the body based on its form-compatibility with the body.

BRIEF DESCRIPTION OF THE DRAWINGS

The attack helicopter realized to achieve the object of the present invention is shown in the accompanying figures, wherein from these figures.

DETAILED DESCRIPTION

The parts illustrated in figures are individually assigned a reference numeral and the corresponding terms of these numbers are listed below.

Figure 1:
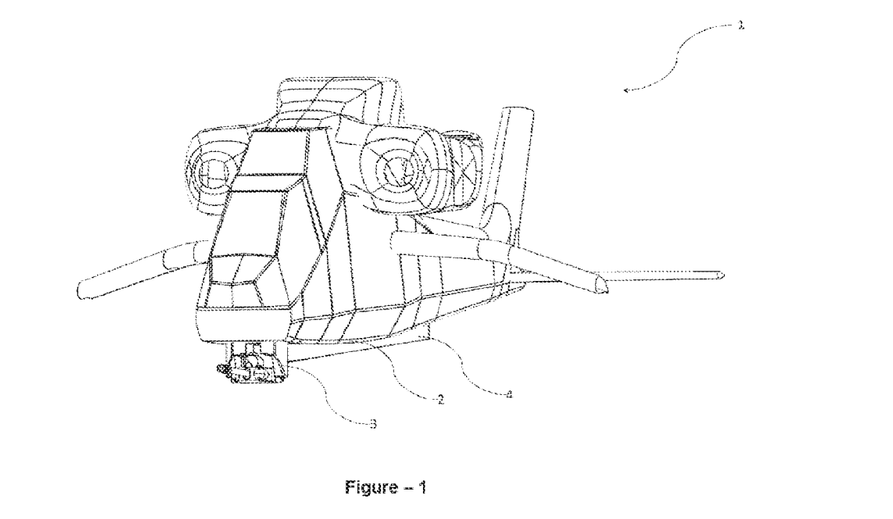
FIG. 1 is a perspective view of an embodiment of an attack helicopter.
Figure 2:
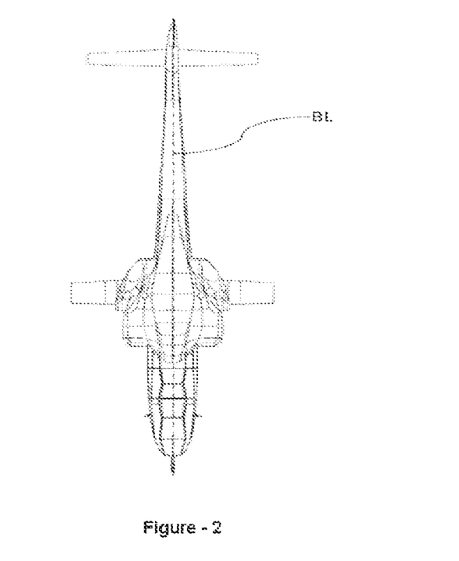
FIG. 2 is a top view of an attack helicopter.

1. Attack helicopter
2. Body
3. Machine cannon
4. Ammunition duct
5. Rotary actuator
6. Gear
7. Rotary retainer
8. Separator wall
9. Transition section
10. Tail
(M) Ammunition
(B) Empty casing
(F) Feeding inlet
(BL) Butt line
(S) Plane of symmetry
(θ) Inclination angle The attack helicopter (1) comprises a body (2) exposed to air flow during the flight of the respective air vehicle, at least one ammunition (M) fired to attack a target, at least one machine cannon (3) enabling the ammunition (M) to be fired, at least one ammunition duct (4) on the body (2), enabling the ammunition (M) to be placed therein and the ammunition (M) to be transmitted to the machine cannon (3), and a butt line (BL) arranged so as to extend lengthwise on the air vehicle and symmetrically divide the air vehicle in two (FIG. 1, FIG. 2).

The attack helicopter (1) of the invention includes an ammunition duct (4) that enables almost all of the ammunition (M) to be located on the body (2), extending along the direction of the butt line (BL), thus allowing almost each of the ammunition (M) to be transmitted in almost the same direction one after another and enabling the ammunition (M) to be efficiently placed on the body (2) (FIG. 5, FIG. 6, FIG. 7, FIG. 8).

In attack helicopters (1), the ammunition (M) is fired by the machine cannons (3) to neutralize the targets. The ammunition duct (4) enables the ammunition (M) to be transmitted uninterruptedly to the machine cannon (3) (FIG. 1, FIG. 2).

During the firing of the machine cannon (3), bullets are discharged rapidly from attack helicopters (1), leading to both positional shifting of the center of gravity of the attack helicopter (1) as well as to vibration problems. Stability and vibration, in turn, pose an important problem for attack helicopters (1) as they increase the likelihood that bullets will miss the target. With placing almost all of the ammunition (M) in the ammunition duct (4), the need for the ammunition box has been eliminated, thus stability and vibration problems are reduced by ensuring that the ammunition (M), which is gathered around a single point in attack helicopters (1) and constitutes an important mass, is spread throughout the attack helicopter (1). Since there is no volume occupying a serious space around a point such as an ammunition box, an improvement is made in the packing of the payloads placed inside the body (2). When a technician intends to access the ammunition (M) during operation and maintenance, he/she can easily access the ammunition (M) located on the body (2) that extends along the attack helicopter (1) (FIG. 5, FIG. 6, FIG. 7, FIG. 8).

In an embodiment of the invention, the attack helicopter (1) comprises an ammunition duct (4) located on the body (2) and on the sides of the body (2), extending to be almost mirror symmetrical with respect to the butt line (BL), thereby allowing an effective placement of the ammunition (M) on the body (2) to take place. By placing the ammunition ducts (4) on the sides of the body (2), the ammunition (M) and ammunition ducts (4) are positioned within the body (2), thus the attack helicopter (1) is exposed to less aerodynamic drag. The ammunition (M) in a mirror symmetrical configuration provides an effective performance in terms of stability and vibration effects on the attack helicopter (1) during firing. Since the ammunition ducts (4) extend in the attack helicopter (1) in a body-integrated (2) form, more space can be provided for payloads placed inside the body (2), thus ensuring an effective placement and/or packing performance. In addition, an effective maintenance and repair is provided by enabling technicians to directly access to ammunition (M) from under the body (2) during operation or maintenance (FIG. 2, FIG. 6, FIG. 7, FIG. 8).

In an embodiment of the invention, the attack helicopter (1) comprises an ammunition duct (4) provided on the body (2) so as to face from the body (2) toward the outside of the air vehicle and extend almost exactly along the direction in which the butt line (BL) extends, thereby enabling the ammunition (m) to be efficiently placed on the body (2). Thus, the ammunition (M) in the ammunition duct (4) allows to create space for payloads to be placed into the body (2), thereby enabling payloads to be effectively packed (FIG. 1, FIG. 2, FIG. 4, FIG. 5).

Figure 3:
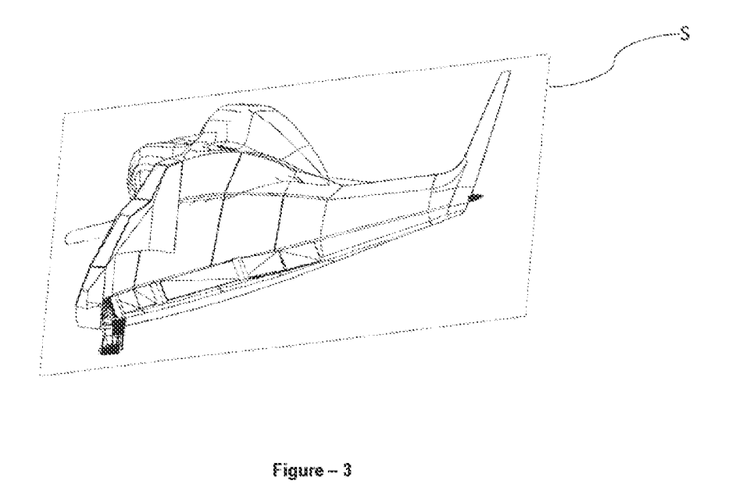
FIG. 3 is a cross-sectional view of an attack helicopter.
Figure 4:
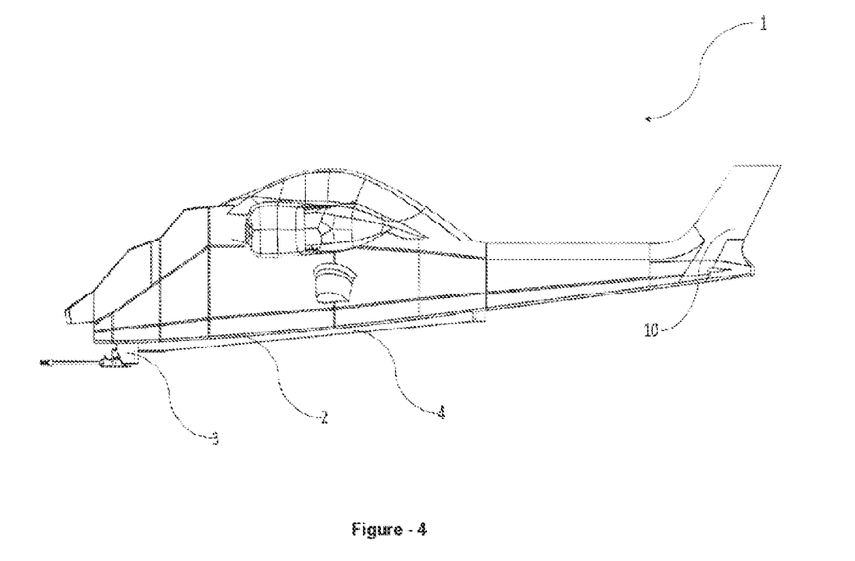
FIG. 4 is a side view of an embodiment of an attack helicopter.
Figure 5:
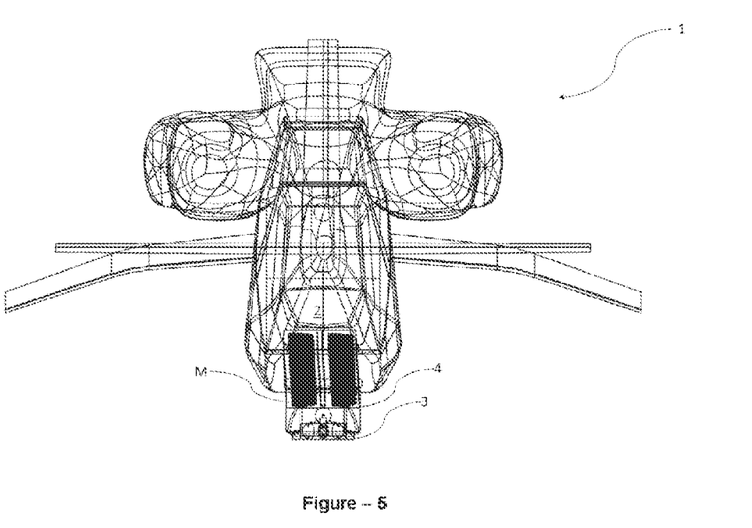
FIG. 5 is a front view of an embodiment of an attack helicopter.
Figure 6:
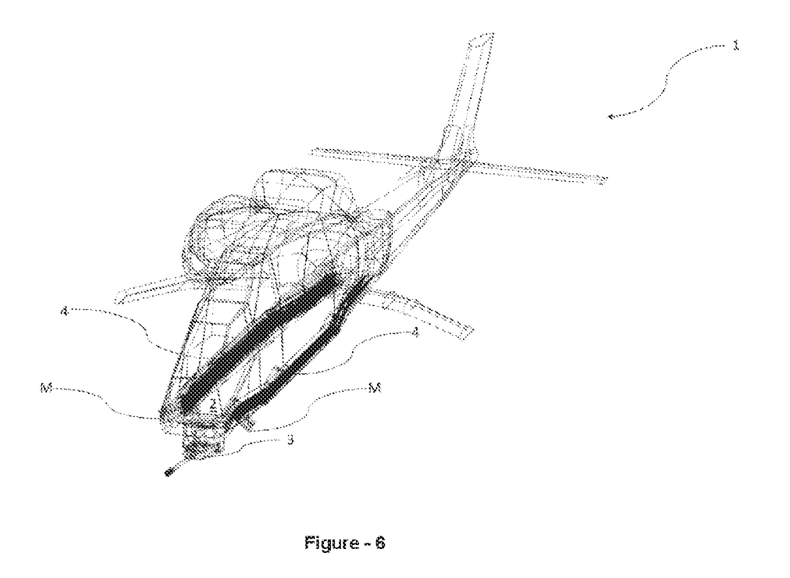
FIG. 6 is a perspective view of another embodiment of an attack helicopter.
Figure 7:
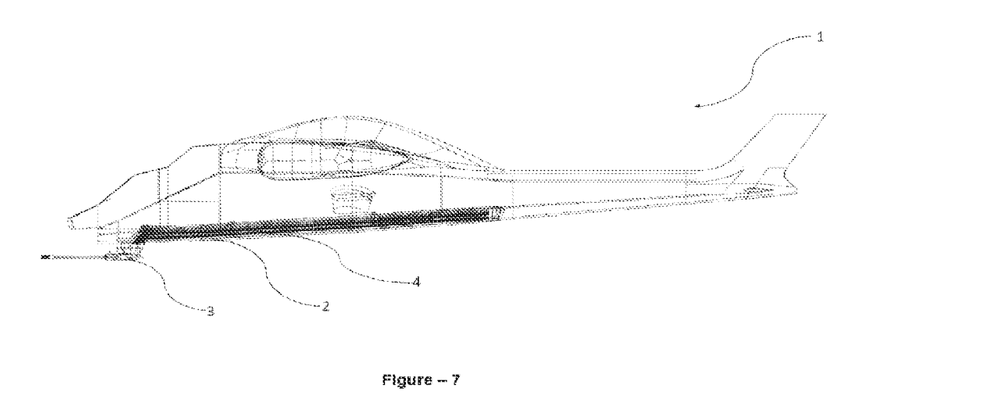
FIG. 7 is a side view of another embodiment of an attack helicopter.
Figure 8:
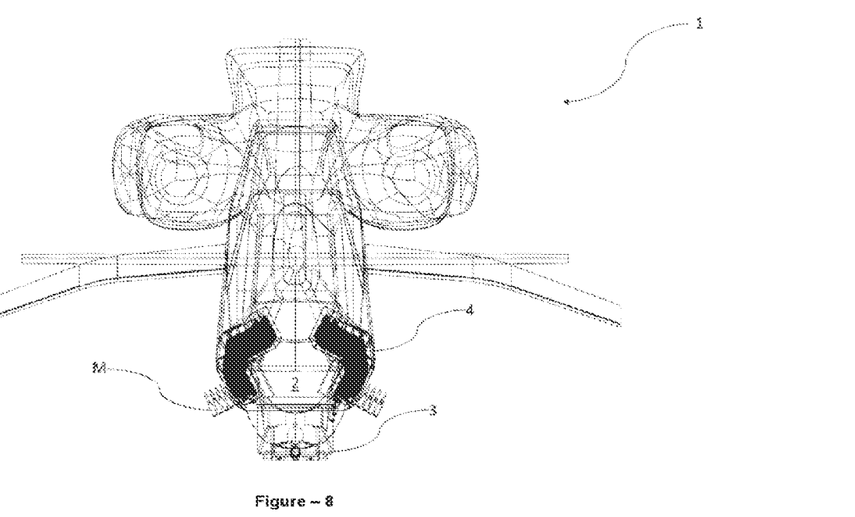
FIG. 8 is a front view of another embodiment of an attack helicopter.
Figure 9:
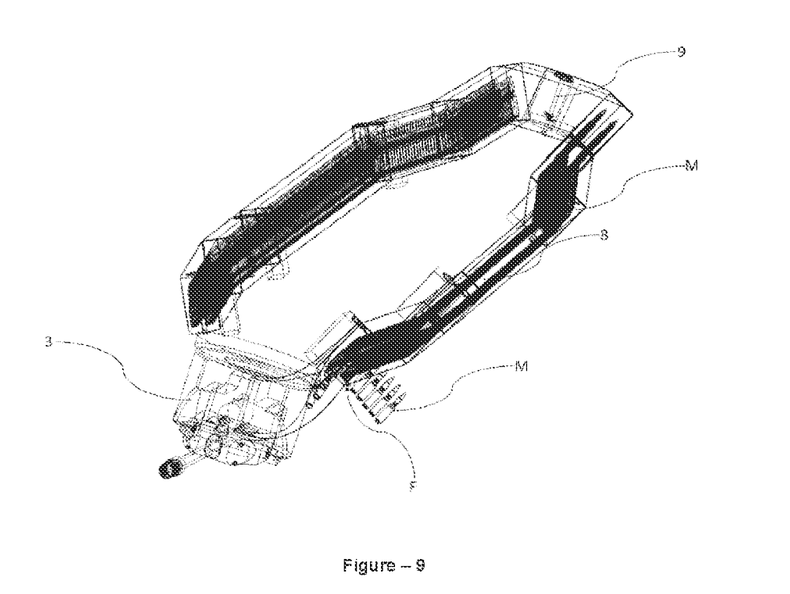
FIG. 9 is a perspective view of a machine cannon, feeding inlet, ammunition, ammunition duct and passage section.
Figure 11:
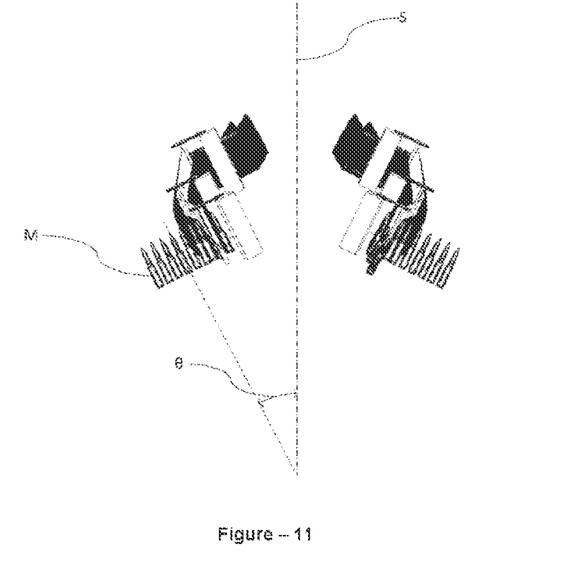
FIG. 11 is a front view of an ammunition.

In an embodiment of the invention, the attack helicopter (1) comprises an ammunition duct (4) which, based on a plane of symmetry (S) that symmetrically divides the air vehicle along the butt line (BL) in two, and on an inclination angle (θ) that the ammunition (M) forms with the plane of symmetry (S), as is predetermined by the manufacturer, enables the blockage risk of ammunition (M) to be reduced during firing by enabling the ammunition (M) to be positioned so as to make an inclination angle (θ) with the plane of symmetry (S) (FIG. 3, FIG. 9, FIG. 11).

In an embodiment of the invention, the attack helicopter (1) comprises an ammunition duct (4) that contacts the surface in such a way that there is almost no gap left between it and the machine cannon (3), is one-piece in such a way as to be form compatible with the body (2) in terms of aerodynamics, and extends almost exactly along the direction in which the butt line (BL) extends, thereby aerodynamically improving the air flow taking place over it. Thus, an effective aerodynamic performance is ensured even when ammunition (M) is carried outside the body (2) (FIG. 1, FIG. 2, FIG. 4, FIG. 5).

In an embodiment of the invention, the attack helicopter (1) comprises more than one rotary actuator (5) located on the body (2) so as to be spaced apart from each other and enabling the ammunition (M) to be transmitted uninterruptedly and continuously along the ammunition duct (4), more than one gear (6) enabling the drive received from the rotary actuator (5) to be transmitted, and more than one rotary retainer (7) located on the body (2) so as to be spaced apart from each other and to be able to rotate about its own axis and enabling the ammunition (M) to be transmitted by pushing them towards the machine cannon (3) by means of the drive transmitted from the gear (6). The rotary retainers (7) enable the ammunition (M) to be carried in such a way as to minimize the blockage risk. The speed of the rotary actuators (5) can be changed by transferring the ammunition (M) to the machine cannon (3) at a desired speed (FIG. 9, FIG. 12).

Figure 12:
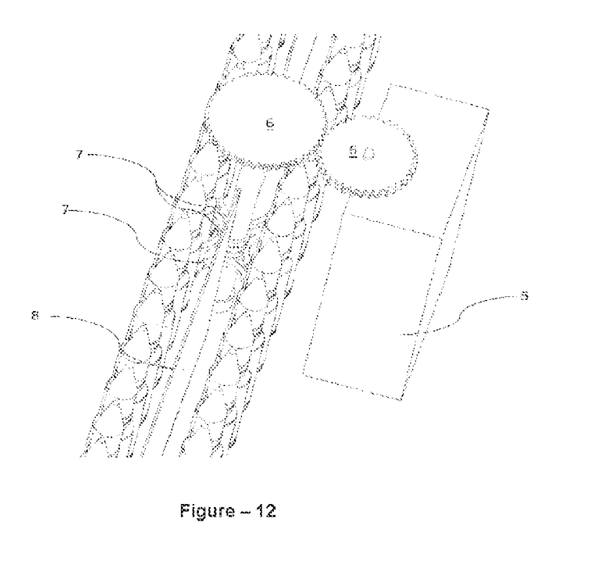
FIG. 12 is a perspective view of a rotary actuator, gear, rotary retainer and separator wall.

In an embodiment of the invention, the attack helicopter (1) comprises ammunition (M) in at least two rows and at least one separator wall (8) positioned between each row, thereby preventing the ammunition (M) in different rows from contacting each other and reducing the blockage risk of ammunition (M) during firing (FIG. 9, FIG. 12).

In an embodiment of the invention, the attack helicopter (1) comprises a separator wall (8) that reduces the blockage risk of ammunition (M) due to its beveled, radiused and/or notched form. The fact that the ammunition duct (4) has a beveled, radius and/or notch form, especially in the cross-sectional transition parts, enables that the transmission is much more stable when the ammunition (M) is transmitted through the cross-sectional transitions of the ammunition duct, thereby reducing the blockage risk of ammunition (M) in the cross-sectional transitions of the ammunition duct (4) (FIG. 12).

In an embodiment of the invention, the attack helicopter (1) comprises at least two ammunition ducts (4) located on the sides of the body (2); and at least one passage section (9) located between the at least two ammunition ducts (4), enabling the ammunition ducts (4) to have an integrated form, thereby allowing the ammunition (M) to be passed through the ammunition ducts (4) located on the sides and to be delivered uninterruptedly and continuously to the machine cannon (3). Thanks to the passage section (9), ammunition (M) transfer can be provided between ammunition ducts (4), each extending almost along the butt line (BL) (FIG. 9).

Figure 10:
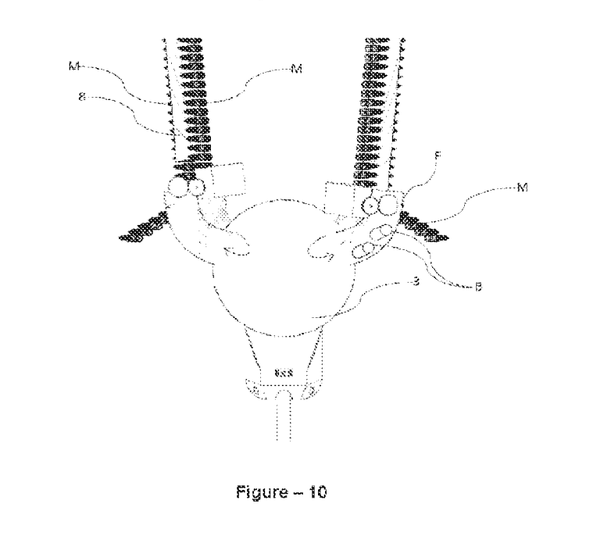
FIG. 10 is a top view of a machine cannon, feeding inlet, ammunition, empty casing and separator wall.

In an embodiment of the invention, the attack helicopter (1) comprises at least one feeding inlet (F) located on the ammunition duct (4) and enabling ammunition (M) to be placed in the ammunition duct (4) by a technician, at least one empty casing (B), which is the remaining part when ammunition (M) transmitted from the ammunition duct (4) is fired, and a machine cannon (3), transmitting the empty casings (B) towards the feeding inlet (F) to be directed back to the ammunition duct (4), thereby reducing the air vehicle's positional shift of the center of gravity during firing (FIG. 9, FIG. 10).

In an embodiment of the invention, the attack helicopter (1) comprises an ammunition duct (4) having an almost exactly rectangular cross-sectional form. The rectangular cross-section reduces the blockage risk of ammunition (M) in the ammunition duct (4), enabling a sufficient amount of ammunition (M) to be transmitted in the ammunition duct (4) (FIG. 9).

In an embodiment of the invention, the attack helicopter (1) comprises an ammunition duct (4) that extends almost exactly along the direction in which the butt line (BL) extends and reduces the risk of ammunition (M) blockage during firing due to its radiused cross-sectional transitions. Thanks to the radiused cross-sectional transitions, the blockage risk is reduced while the ammunition (M) is transmitted through the ammunition duct (4) (FIG. 2, FIG. 9).

In an embodiment of the invention, the attack helicopter (1) comprises a machine cannon (3) having a single feeding or double feeding system configuration. Thus, it can be ensured that the ammunition (M) can be fed to the attack helicopter (1) from one side or from two sides by a technician (FIG. 10).

In an embodiment of the invention, the attack helicopter (1) comprises a tail (10), as a control surface, in the rear side of the air vehicle, and an ammunition duct (4) protruding towards the butt line (BL) almost in the tail (10) region of the air vehicle and allowing the ammunition (M) to be placed almost exactly in a co-aligned manner with the body (2) due to its form-compatibility with the body (2). Thus, the entire ammunition (M) in the attack helicopter (1) can be placed in the ammunition duct (4) (FIG. 9, FIG. 10).

The invention claimed is:

1. An attack helicopter (1) comprising:
a body (2) exposed to air flow during flight of the attack helicopter (1);
at least one ammunition (M) fired to attack a target;
at least one machine cannon (3) enabling the ammunition (M) to be fired;
at least one ammunition duct (4) on the body (2) and arranged along a butt line (BL) that extends lengthwise on the attack helicopter (1) and symmetrically divides the attack helicopter (1) in two, the at least one ammunition duct (4) enabling the ammunition (M) to be placed therein and the ammunition (M) to be transferred to the machine cannon (3), wherein the ammunition duct (4) enables all of the ammunition (M) to be located on the body (2) and to extend along the direction on which the butt line (BL) extends, prevents the accumulation of ammunition (M) at a single point and thus a high mass at the single point in the body (2), through allowing each of the ammunition (M) to be transmitted in the same direction one after another and enabling the ammunition (M) to be efficiently placed on the body (2);
more than one rotary actuator (5) located on the body (2) so as to be spaced apart from each other and enabling the ammunition (M) to be transmitted uninterruptedly and continuously along the ammunition duct (4);
more than one gear (6) enabling the drive received from the rotary actuator (5) to be transmitted; and
more than one rotary retainer (7) located on the body (2) so as to be spaced apart from each other and to be able to rotate about its own axis and enabling the ammunition (M) to be transmitted by being pushed towards the machine cannon (3) by means of the drive transmitted from the gear (6).

2. The attack helicopter (1) as claimed in claim 1, wherein the ammunition duct (4) is located on the body (2) and on the sides of the body (2), extends to be almost mirror symmetrical with respect to the butt line (BL), thereby enabling the ammunition (M) to be efficiently placed on the body (2).

3. The attack helicopter (1) as claimed in claim 1, wherein the ammunition duct (4) is provided on the body (2) so as to face from the body (2) to the outside of the attack helicopter (1) and extends almost exactly along the direction in which the butt line (BL) extends, thereby enabling the ammunition (M) to be efficiently placed on the body (2).

4. The attack helicopter (1) as claimed in claim 1, wherein based on a plane of symmetry(S) that symmetrically divides the attack helicopter (1) along the butt line (BL) into two and on an inclination angle ($\theta$) that the ammunition (M) forms with the plane of symmetry(S), the ammunition duct (4) enables the blockage risk of ammunition (M) to be reduced during firing by enabling the ammunition (M) to be positioned so as to form an inclination angle ($\theta$) with the plane of symmetry(S).

5. The attack helicopter (1) as claimed in claim 1, wherein the ammunition duct (4) contacts the surface in such a way that there is almost no gap left between the ammunition duct (4) and the machine cannon (3), wherein the ammunition duct (4) is one-piece with the body (2) in such a way as to be form compatible therewith in terms of aerodynamics, and extends almost exactly along the direction in which the butt line (BL) extends, thereby aerodynamically improving the air flow taking place over it.

6. The attack helicopter (1) as claimed in claim 1, comprising at least two ammunition ducts (4) located on the sides of the body (2); and at least one passage section (9) located between the at least two ammunition ducts (4), enabling the ammunition ducts (4) to have an integrated form, thereby enabling the ammunition (M) to be passed through the ammunition ducts (4) located on the sides to be delivered uninterruptedly and continuously to the machine cannon (3).

7. The attack helicopter (1) as claimed in claim 1, comprising at least one feeding inlet (F) located on the ammunition duct (4) and enabling the ammunition (M) to be placed in the ammunition duct (4) by a technician, at least one empty casing (B), which is the remaining part when ammunition (M) transmitted from the ammunition duct (4) is fired; the machine cannon (3) transmitting the empty casings (B) towards the feeding inlet (F) to be directed back to the ammunition duct (4), thereby reducing a positional shift of the center of gravity of the attack helicopter (1) during firing.

8. The attack helicopter (1) according to claim 1, wherein the ammunition duct (4) has an almost rectangular cross-section.

9. The attack helicopter (1) as claimed in claim 1, wherein the ammunition duct (4) extends almost exactly along the direction in which the butt line (BL) extends and reduces the blockage risk of ammunition (M) during firing based on its radiused cross-sectional transitions.

10. The attack helicopter (1) as claimed in claim 1, wherein the machine cannon (3) has a single feeding or double feeding system configuration.

11. The attack helicopter (1) as claimed in claim 1, comprising a tail (10) as a control surface in the rear side of the attack helicopter (1); the ammunition duct (4) protruding towards the butt line (BL) almost in the tail (10) region of the attack helicopter (1) and allowing the ammunition (M) to be placed almost exactly in a co-aligned manner with the body (2) due to its form-compatibility with the body (2).

12. An attack helicopter (1) comprising:
 a body (2) exposed to air flow during flight of the attack helicopter (1);
 at least one ammunition (M) fired to attack a target;
 at least one machine cannon (3) enabling the ammunition (M) to be fired;
 at least one ammunition duct (4) on the body (2) and arranged along a butt line (BL) that extends lengthwise on the attack helicopter (1) and symmetrically divides the attack helicopter (1) in two, the at least one ammunition duct (4) enabling the ammunition (M) to be placed therein and the ammunition (M) to be transferred to the machine cannon (3), wherein the ammunition duct (4) enables all of the ammunition (M) to be located on the body (2) and to extend along the direction on which the butt line (BL) extends, prevents the accumulation of ammunition (M) at a single point and thus a high mass at the single point in the body (2), through allowing each of the ammunition (M) to be transmitted in the same direction one after another and enabling the ammunition (M) to be efficiently placed on the body (2); and
 wherein the ammunition (M) is positioned in at least two rows and at least one separator wall (8) is provided between each row, thereby preventing the ammunition (M) in different rows from contacting each other and reducing the blockage risk of ammunition (M) during firing.

13. The attack helicopter (1) as claimed in claim 12, wherein the separator wall (8) reduces the blockage risk of ammunition (M) by having a beveled, radiused and/or notched form.

* * * * *